Aug. 19, 1958  D. SAINT  2,847,931
BREAD TOASTERS
Filed Sept. 11, 1953  2 Sheets-Sheet 2
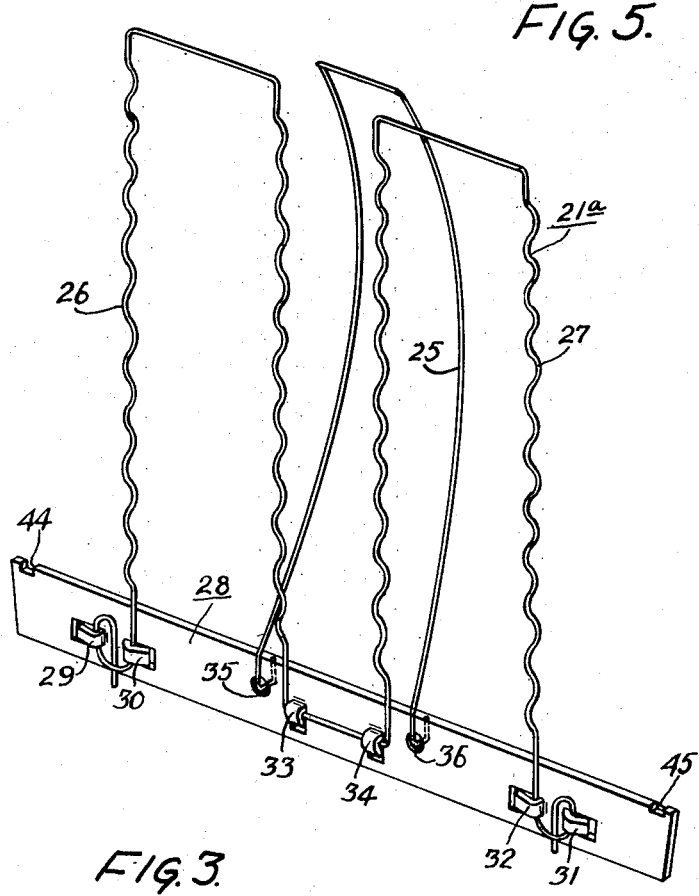
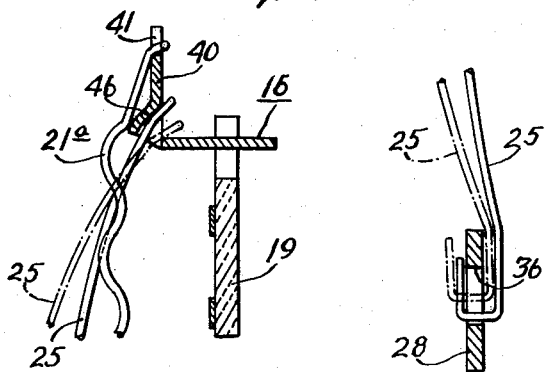
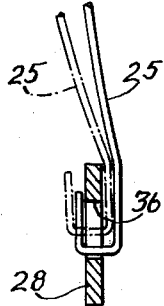
Inventor:
David Saint
by his Attorneys
Howson & Howson United States Patent Office 2,847,931
Patented Aug. 19, 1958

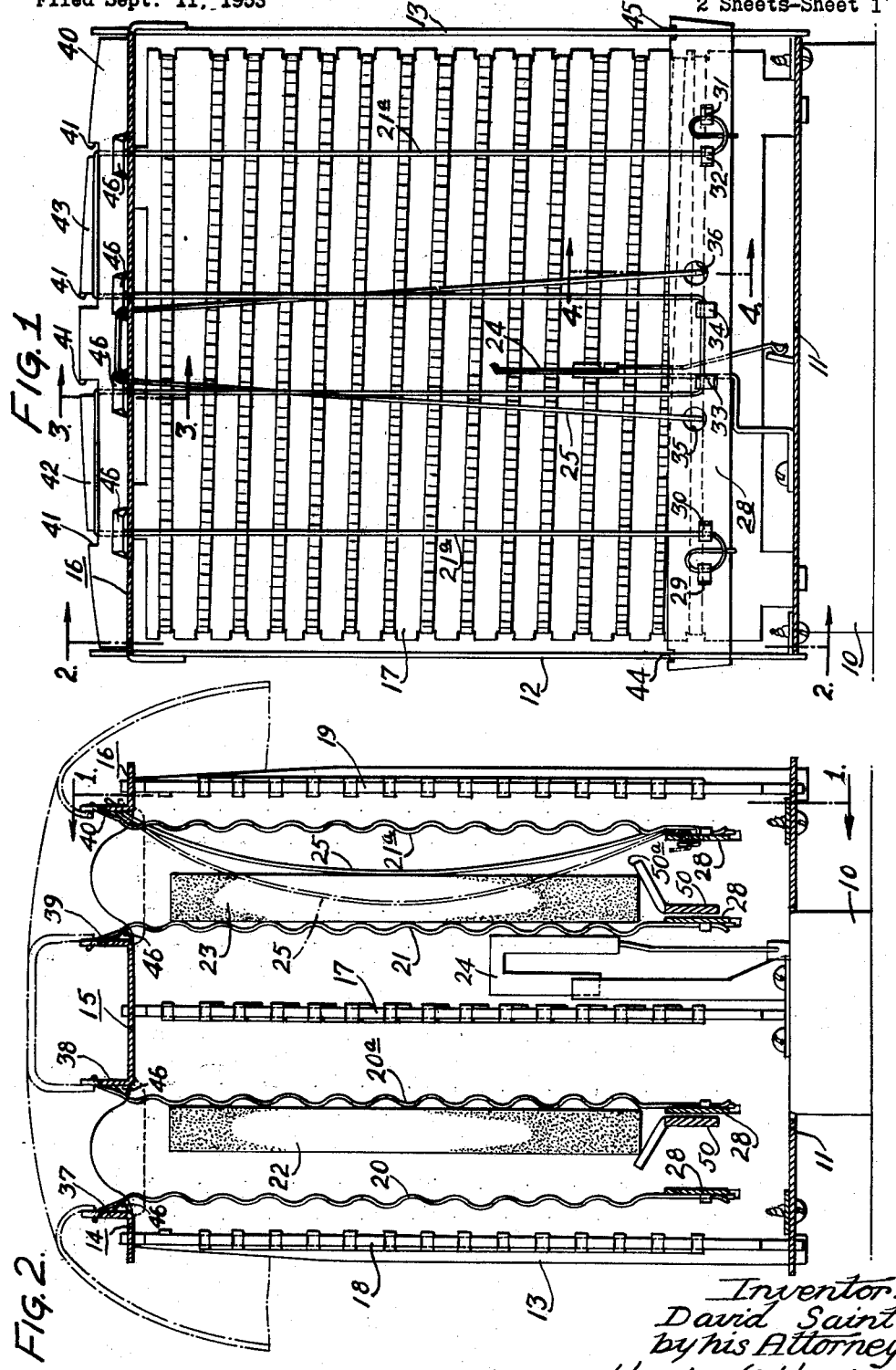

2,847,931
BREAD TOASTERS

David Saint, Rockledge, Pa., assignor to Proctor Electric Company, Philadelphia, Pa., a corporation of Pennsylvania Application September 11, 1953, Serial No. 379,648

1 Claim. (Cl. 99—389)

This invention relates to bread toasters, and more particularly to the elements thereof for maintaining a bread slice in proper relation to the heating elements, and also in proper relation to a bread-sensitive thermostat where such is used.

In any bread toaster, it is necessary to provide grille wires to maintain the bread in proper relation to the heating elements. In the past, the grille wires have been objectionable in that they have produced lines on the bread surface where they engage the same. The line areas are either relatively untoasted areas due to the shielding of the bread from the heating elements, or they are over-toasted or burnt areas where the grille wires become excessively hot and sear the bread surface.

The principal object of the present invention is to overcome this objection.

Another object of the invention is to provide a grille wire construction which can be easily mounted in a toaster.

Most modern toasters are of the automatic type in which the toasting operation is automatically controlled by thermostatic or timing means. One form of automatic toaster is that employing a bread-sensitive thermostat which responds to the surface temperature of a bread slice. It is necessary in such a toaster to provide some means for positioning the bread slice against opposing grille wires so that the bread slice will be maintained in proper relation to the thermostat. In the past, the bread-positioning means employed have also been objectionable because of failure to function or for the same general reason as have the grille wires.

A further object of the present invention is to overcome these objections.

A still further object of the invention is to provide a combination unit comprising both a grille wire assembly and a bread-positioning element.

The invention may be fully understood by reference to the accompanying drawings, in which:

Fig. 1 is a sectional side view of the internal structure of a toaster embodying the invention, the view being taken on line 1—1 of Fig. 2;

Fig. 2 is a sectional end view taken on line 2—2 of Fig. 1;

Figs. 3 and 4 are fragmentary sectional views taken on lines 3—3 and 4—4 of Fig. 1, respectively; and Fig. 5 is a perspective view of a combined unit including grille wires and a bread-positioning element, the unit being shown apart from the toaster for the purpose of illustration.

Referring more particularly to the drawings, Figs. 1 and 2 show the internal structure of a toaster manufactured and sold for household use. The present invention is not concerned with the details of the structure which may be of any suitable form, and it suffices to note that the structure comprises a base 10, a bottom 11, end plates 12 and 13 secured to opposite ends of the base plate 11 and extending upwardly therefrom, and top members 14, 15 and 16 extending between the end plates and secured thereto. A central heating unit 17 and outer heating units 18 and 19 are supported by the structure. Grille wires 20 and 20a define one of the bread wells, while grille wires 21 and 21a define the other bread well. Bread slices are represented at 22 and 23 in the two bread wells. Positioned between the central heating unit 17 and the grille wire 21 is a bread-sensitive thermostat 24 which is represented as being of the form disclosed and claimed in a U. S. patent of W. H. Vogelsberg, No. 2,667,115, issued January 26, 1954. The present invention is not concerned with the details of the bread-sensitive thermostat.

The grille wires are constructed in accordance with the present invention. Associated with the grille wire 21a is a bread-positioning element 25 which is also a feature of this invention. Four similar units are employed to provide the grille wires, the only difference among them being the inclusion of the bread-positioning element in association with the unit providing grille wire 21a.

By way of example, Fig. 5 shows the combined unit which provides both the grille wire 21a and the bread-positioning element 25. Each of the grille wire units comprises a plurality of runs of fine wire having undulations or corrugations therein and arranged under tension in the toaster. Preferably, each grille wire unit comprises a plurality of U-shaped wire sections, there being two U-shaped sections 26 and 27, in the illustrated embodiment. This arrangement provides twice as many runs of wire as there are U-shaped sections, the wire runs being arranged generally in a common plane. Preferably, a single wire is employed for the grille wire in each unit. The undulations or corrugations are formed in a pressing operation, the straight portions of the wire being left undisturbed. The undulations or corrugations are substantially at right angles to the general plane of the unit, so that each wire presents a series of protuberances toward the bread slice. It is apparent that the pressing of co-planar corrugations represents just one method and one type of elastic small contact area wireform that might be employed. Thus, it is possible to use a long pitch helical coil of fine wire as another embodiment. Preferably, the wire is a stainless steel wire having a diameter of .015 inch, or of that order. A transverse plate or cross bar 28 extends across the open ends of the U-shaped sections, and the open ends of said sections are secured to the plate. In the form shown, tabs 29, 30 and 31, 32 are formed as lancings from the plate, and the ends of the wire are passed under the tabs as shown, the tabs being then bent to firmly hold the wire ends. The central portion of the wire intermediate the U-shaped sections is straight and is held by tabs 33, 34 which are also formed as lancings from the plate 28 and are bent to secure the wire.

In the combined unit shown in Fig. 5, the bread-positioning element 25 is formed of a fine wire which is bent to U-shape, and the ends of which extend through holes 35 and 36 formed in the plate 28, the wire ends being bent in the form of a hook. The U-shaped wire element 25 is bowed outwardly from the general plane of the grille wires as shown in Fig. 4. The wire 25 is preferably a stainless steel wire having a diameter of .015 inch or of that order.

Referring again to Figs. 1 and 2, the top members 14 to 16 of the toaster are provided with upwardly extending flanges 37 to 40 which serve to support the upper portions of the grille wires. As shown in Fig. 1, each of the flanges is provided with four spaced notches 41 to provide tongues 42 and 43 over which the inverted U-shaped sections of the grille wire are placed. The transverse plate of each grille wire assembly is of slightly greater length than the distance between the end plates 12 and 13, and has notches 44 and 45 at its ends. The end plates 12 and 13 are provided with slot openings to receive the end portions of each transverse plate, said openings being disposed so that the undulated wire runs will be tensioned when the grille wire unit is mounted in place.

In mounting each grille wire unit, the upper ends of the inverted U-shaped sections are placed over the supporting tongues and then the plate is slipped into place in engagement with the end plates of the toaster. Each of the wire-supporting flanges 37 to 40 has lancings 46 over which the wire is drawn to tension it. Since the wire runs of each grille wire assembly are of the nature of tensioned spring elements, they are substantially unaffected by ordinary tolerances in the supporting structure or by temperature changes. As may be seen in Fig. 2, the undulate form of the wire runs provides only small areas of the contact with the bread slices.

In case of the combined unit of Fig. 5, in the mounting of this unit, the upper end of the inverted U-shaped element 25 extends through the openings in flange 40 produced by the two central lancings 46 as shown in Fig. 3. The element 25 is usually inserted after the grille wire assembly has been mounted. Then the legs of the element 25 are passed through the openings in flange 40 and are hooked in the holes 35 and 36 of cross bar 28 as shown in Fig. 4. When in place, as shown in Fig. 2, the element 25 is bowed toward the associated bread position and serves to press an inserted bread slice toward the grille wire 21. In the free condition of element 25, it is bowed to an arc having a radius of approximately three and one-half inches. In the type of toaster shown, the bread-supporting elements of the bread carriage designated by number 50 move vertically in the bread wells. When the bread carriage is in raised position, the element 25 is held back out of the way by surface 50a on the carriage element 50 in the associated well, permitting an inserted bread slice to be lowered into the well by downward movement of the bread carriage. As the carriage reaches its lowered position, element 25 is released and is effective to push the bread against the opposing grille wire. Figs. 3 and 4 show the effect of pushing the center of the element 25 inward and the loose mounting apertures that permit the elements to move freely from the uncompressed position shown as a dot-dash line and the compressed solid line showing.

The grille wire structure provided by the present invention has a number of important advantages. Because of the ability of the corrugated wire runs to stretch without materially changing the depth of the corrugations, the structure is unaffected by normal tolerances of manufacture. Moreover, thermal expansion of the wires or of the associated toaster structure is compensated by the ability of the corrugated wires to stretch. Further still, the tensioning of the wires over the projecting lancings 46, as shown in Fig. 2, positions the front plane of the corrugations inwardly by the full height of the corrugations with respect to the openings constituting the entrances to the bread wells, and this arrangement facilitates insertion of the bread slices and also avoids any tendency for the bread slices to catch at the entrance openings as they leave the bread wells. The protrusion of the top corrugations is further enhanced by the fact that before assembly the vertical extension from the first corrugation is substantially straight. Thus, on assembly the stressing of this portion (see Fig. 3) will cause the axis of the first corrugation to assume a slope on a line which is substantially a continuation of the straight portion.

The bread-positioning element 25 also has important advantages. The extreme flexibility of the very fine or light wire enables it to give under distorting forces without becoming permanently distorted or damaged and without affecting its operation. Moreover, the shape and mounting of the wire element also enables it to withstand forces to which it may be subjected. Due to its mounting, it can move freely when it is subjected to pressure, and if the applied force becomes excessive, it will flex sidewards along its length without becoming permanently distorted. Also, the pair of wires combined in one U-shape provides stability in an otherwise unstable structure without a critical pivot design. Furthermore, it is pointed out that the wire legs of element 25 respectively cross over each of the two central grille wires (see Fig. 1), the closed end of the U-shaped element 25 being narrower than its open end. Thus, any inadvertent pushing of the bread-positioning element back toward the heating element is limited, and engagement of the bread-positioning element with the heating element is prevented by the engagement of the of the bread-positioning element with the adjacent grille wires.

While a particular embodiment of the invention has been illustrated and described, the invention is not lmited thereto, but contemplates such other embodiments and modifications as may occur to those skilled in the art.

I claim:

In a bread toaster, the combination comprising a bread heating element, a framework, and a grille wire structure for supporting a bread slice in spaced relation to said heating element and parallel thereto, comprising a plurality of lengths of fine resilient wire each of substantially U-shaped configuration and disposed in spaced coplanar relationship to each other, a first pair of rigid members extending substantially at right angles to said lengths of wire and serving as mounting supports to which the opposite ends of each of said lengths of wire are secured, one of said first pair of rigid members having lugs projecting therefrom, with the bights of the said U-shaped wires mounted on the said lugs while the opposite free ends of said U-shaped wires are affixed to the other of said first pair of rigid members, a second pair of rigid members having parallel slots thereon, said last mentioned pair of rigid members extending substantially perpendicular to said first pair of rigid members, said first and second pairs of rigid members being interconnected with each other at their corresponding ends, said lengths of wire having undulations with crests extending toward said heating element and said first pair of rigid members being spaced from each other with their mounting supports slightly farther apart than the normal untensioned lengths of said wires, whereby said wires are maintained in tensioned condition by said mounting with the crests of said undulations serving to position the slice of bread being toasted in desirable spaced relationship to said heating element, and said other rigid member of said first pair of rigid members is held by the tension of said wires in interlocked relationship with the parallel slots in said second pair of rigid members.

References Cited in the file of this patent

UNITED STATES PATENTS

| | | |
|---|---|---|
| 1,387,670 | Strite | Aug. 16, 1921 |
| 2,079,382 | Myers | May 4, 1937 |
| 2,147,457 | Rahr | Feb. 14, 1939 |
| 2,171,897 | Sardeson | Sept. 5, 1939 |
| 2,179,422 | Myers et al. | Nov. 7, 1939 |
| 2,253,637 | McCullough | Aug. 26, 1941 |
| 2,368,026 | Jepson | Jan. 23, 1945 |
| 2,419,355 | Koci | Apr. 22, 1947 |
| 2,538,650 | Palmer | Jan. 16, 1951 |
| 2,570,453 | Huck | Oct. 9, 1951 |
| 2,598,592 | Olson et al. | May 27, 1952 |
| 2,641,993 | Morphy et al. | June 16, 1953 |
| 2,685,633 | Olson et al. | Aug. 3, 1954 |

FOREIGN PATENTS

| | | |
|---|---|---|
| 948,281 | France | Jan. 24, 1949 |